(12) United States Patent
Jarzynka, Jr.

(10) Patent No.: US 8,256,125 B2
(45) Date of Patent: Sep. 4, 2012

(54) SLIDING SQUARE FOR TAPE MEASURE

(76) Inventor: Clifford J. Jarzynka, Jr., Kokomo, IN (US)

( * ) Notice: Subject to any disclaimer, the term of this patent is extended or adjusted under 35 U.S.C. 154(b) by 465 days.

(21) Appl. No.: 12/653,426

(22) Filed: Dec. 14, 2009

(65) Prior Publication Data

US 2010/0154234 A1    Jun. 24, 2010

Related U.S. Application Data

(60) Provisional application No. 61/203,261, filed on Dec. 19, 2008.

(51) Int. Cl.
*B43L 7/027* (2006.01)
*G01B 3/10* (2006.01)

(52) U.S. Cl. .............. 33/427; 33/760; 33/42; 33/451; 33/481

(58) Field of Classification Search .............. 33/427, 33/42, 429, 451, 464, 474, 478, 481, 760, 33/836, 421, 423, 424
See application file for complete search history.

(56) References Cited

U.S. PATENT DOCUMENTS

| | | | | |
|---|---|---|---|---|
| 1,135,259 A * | 4/1915 | Cokely | ............................. | 33/481 |
| 3,488,868 A * | 1/1970 | Gutowski et al. | ............... | 33/464 |
| 4,642,898 A * | 2/1987 | Miller | ............................. | 33/761 |
| D299,437 S | 1/1989 | Kull | | |
| 5,077,910 A * | 1/1992 | Smith | ............................. | 33/760 |
| 5,113,596 A | 5/1992 | Meyers | | |
| 5,170,568 A * | 12/1992 | Wright | ............................. | 33/480 |
| D332,413 S | 1/1993 | Douglas | | |
| 5,456,015 A * | 10/1995 | Butcher et al. | .................. | 33/451 |
| 5,782,007 A * | 7/1998 | Harris | ............................. | 33/768 |
| 5,787,599 A * | 8/1998 | Clifton | ............................ | 33/760 |
| 5,809,662 A * | 9/1998 | Skinner | ........................... | 33/768 |
| 5,848,481 A * | 12/1998 | Parsons et al. | .................. | 33/760 |
| D436,543 S | 1/2001 | Douglas | | |
| 6,226,885 B1 * | 5/2001 | Korich | ............................ | 33/760 |
| 6,598,311 B2 | 7/2003 | Noon | | |
| 7,219,440 B2 | 5/2007 | Lewis et al. | | |
| 7,228,644 B1 | 6/2007 | Hellem et al. | | |
| 7,254,899 B2 * | 8/2007 | Marocco et al. | ................ | 33/760 |
| 7,484,313 B1 * | 2/2009 | Ogilvie | ............................ | 33/770 |
| 2004/0172846 A1 | 9/2004 | McRae | | |

* cited by examiner

*Primary Examiner* — Christopher Fulton
(74) *Attorney, Agent, or Firm* — Frank Lachenmaier (57) ABSTRACT

The present invention relates generally to a sliding square that can be slipped over a standard retractable tape measure that is extendable perpendicularly to abutment wall allowing 0-90 degrees angle lines to be scribed at measured distances from the end of a work piece. Sliding Square also may include a depth gage, bubble levels on the x and y planes, a protractor scale along with linear dimensions along its right angle straight edge side and standard rafter pitch angles to be defined. Abutment wall t's into base 32 extending equally above and below base so that it functions right side up from the left side of a work piece or flipped over from the right side.

6 Claims, 7 Drawing Sheets

SLIDING SQUARE FOR TAPE MEASURE

BACKGROUND

1. Field of Invention

The present invention relates generally to a combination carpenter's layout tool that can be slipped over a standard retractable tape measure in two different planes or used on its own as a depth gage, level, triangle or square or distance measuring instrument. This device may include a depth gage, bubble levels on x and y planes, a protractor scale, linear scales along its straight edge sides, a stud centerline indicia, and standard rafter pitch angle indicia with matching indicia on both top and bottom for use as either a right or left handed tool.

2. Prior Art

There have been several patents showing various combinations of standard carpenter measuring tools but they involve custom tape measure housing to square assemblies. To resolve this problem the present invention is designed to easily slip on any standard width retractable tape measure or slip off and function independently. To date the prior art devices have proven commercially impractical for reasons of complexity, cost, durability and difficulty in carrying, storage or use and only provide tape measure guide channels in one plane.

SUMMARY OF THE INVENTION

A generally planar base with a simple square or right angle frame that has a bridged slot in one or two planes that retractable tapes of ½, ¾, 1, 1¼ or 1½ inch widths slip through and are guided by. It has an abutment wall parallel to direction of the tape extension, an edge at right angles to abutment wall with a linear scale inscribed thereon, starting at the inside of abutment wall. It also may embody a protractor with its zero point the same as the linear scale, bubble levels in both x and y planes, a depth gauge, a stud centerline indicia and standard rafter angle indicia.

DRAWINGS

In order that the invention is fully understood it will now be described with reference to the following drawings in which.

Tape measures are shown in broken lines, as they are not part of this invention but shown for illustrative purposes only.

DESCRIPTION

In order that Sliding Square 10 is fully understood it will now be described by way of the following examples. This new invention is a convenient and easily adaptable device for use either as a free standing triangle, square, level and depth gauge combination layout device or in conjunction with a retractable tape measure 34. Sliding Square 10 is used for marking lines at a specific distance and/or angle from the side or end of a given work piece from either the right or left hand side.

Figure 7A:
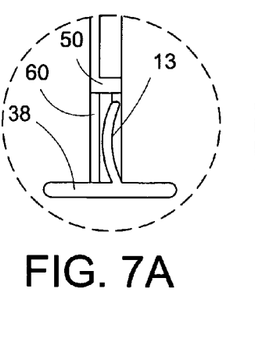
FIG. 7A is a partial left side view showing a curvilinear free side centering wall option.
Figure 7B:
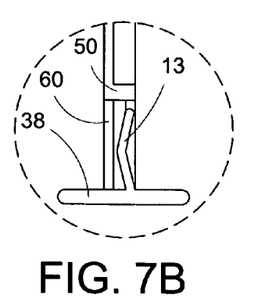
FIG. 7B is a partial left side view showing a V shaped free side centering wall option.
Figure 7C:
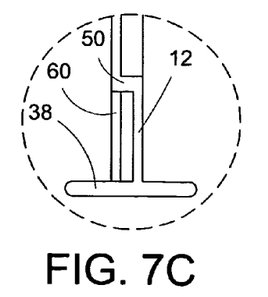
FIG. 7C is a partial left side view showing a top wall as a continuation of top wall 12 option.
Figure 7D:
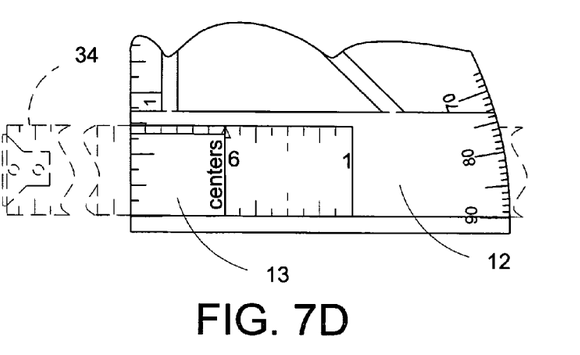
FIG. 7D is a partial top view showing a tape extended out from front face with inside edge of centering wall aligning with centers indicia on tape.

FIGS. 1A, 1B 1C and 1D describe a preferred embodiment of Sliding Square 10 in which abutment wall 38 is used to guide Sliding Square 10 along the edge of a work piece. Abutment wall 38 is approximately 3 inches long and ⅛ inch thick and depends approximately ⅝ inch from top wall 12 and rises approximately ⅜ inches above top wall 12. Top wall 12 is approximately 3/32 inch thick and extends away from abutment wall 38 approximately 1 inch, intersecting with inside wall 50 which depends from top wall 12 approximately ¼ inch to generally planar base 32. First centering wall 13, as shown in FIG. 7A, extends from front face 52 to tape opening 48 and from abutment wall 38 toward inside wall 50 but does not attach to it. It has a concave surface matching the curvilinear shape of retractable tape measure 34 or a V shaped wall as shown in FIG. 7B with a approximately 1/32 inch radius at its nether point. This feature allows various width retractable tape measures 34 to self-align as the tape is extended from beneath first centering wall 13 across front face 52 to end of work piece. The third option shown in FIG. 7C discloses centering wall 13 as an extension of top wall 12. Top wall 12 has tape opening 48 approximately 1 inch long by ¾ inch wide and centered in top wall 12, beginning approximately ¾ inch from front face 52. This inside wall of tape opening 48 when aligned with the desired centers between studs, i.e., 16 inches on tape measure allows for marking the desired centers using the front face 52 as shown in FIG. 7D.

Base 32's bottom surface is approximately ¼ inch below top surface of top wall 12. Front face 52 steps down approximately 3/16 inches from top surface of top wall 12 to top surface of base 32. Base 32 is approximately 3/32 inches thick and extends approximately 7⅛ inches from abutment wall 38 inside surface. Base 32 is approximately 1½ inches wide at distal end 54 and continues at that width until it intersects a 3 inch arc with a center at inside corner of abutment wall 38 on front face 52. Parallel to and approximately ¼ inch inboard from front face 52, first stiffening rib 45 runs from inside wall 50 to distal end of linear scale 28. First stiffening rib 45 is approximately ⅛ inch thick and depends from the top surface of top wall 14 to bottom surface of base 32. First stiffening rib 45 connects perpendicularly to second stiffening rib 46 that runs across distal end 54 of linear scale 28 approximately ¾ inch in length. Stiffening rib 46 connects perpendicularly to third stiffening rib 47 that runs parallel to first stiffening rib 45 and whose outer edge is approximately ¾ inch from front face 52. Third Stiffening rib 47 runs from second stiffening rib 46 back toward abutment wall 38 until it intersects a 3 inch radius centered at the intersection of front face 52 and the inside edge of abutment wall 38 and then angles back to inside wall 50 at a 45 degree outgoing angle.

An opening through base 32 has a proximal 45 degree edge 44 aligned with 45 degree wall of third stiffening rib 47 in opening in base 32 to allow marking a 45 degree line to abutment wall 38. The distal side of opening in base 32 is a 2½ inch radius arc concentric with 3 inch radius arc of protractor edge of base 32. Outside of 2½ inch radius is marked with indicia of standard rafter angle scale 56 and inside edge of 3 inch arc is marked with protractor angle scale 30.

Figure 1A:
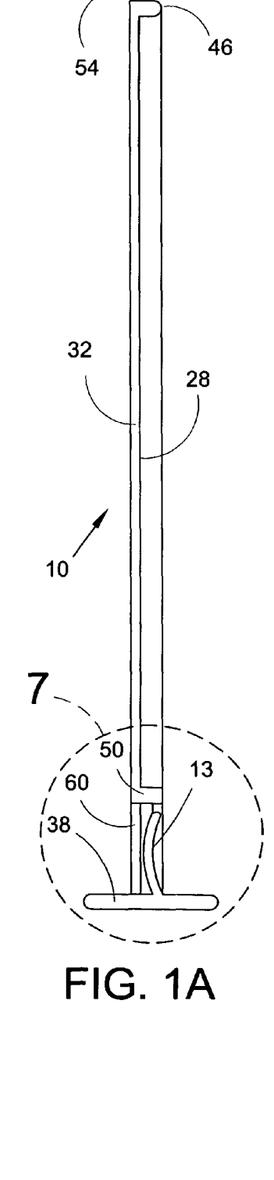
FIG. 1A is a left side view of a sliding square.
Figure 1B:
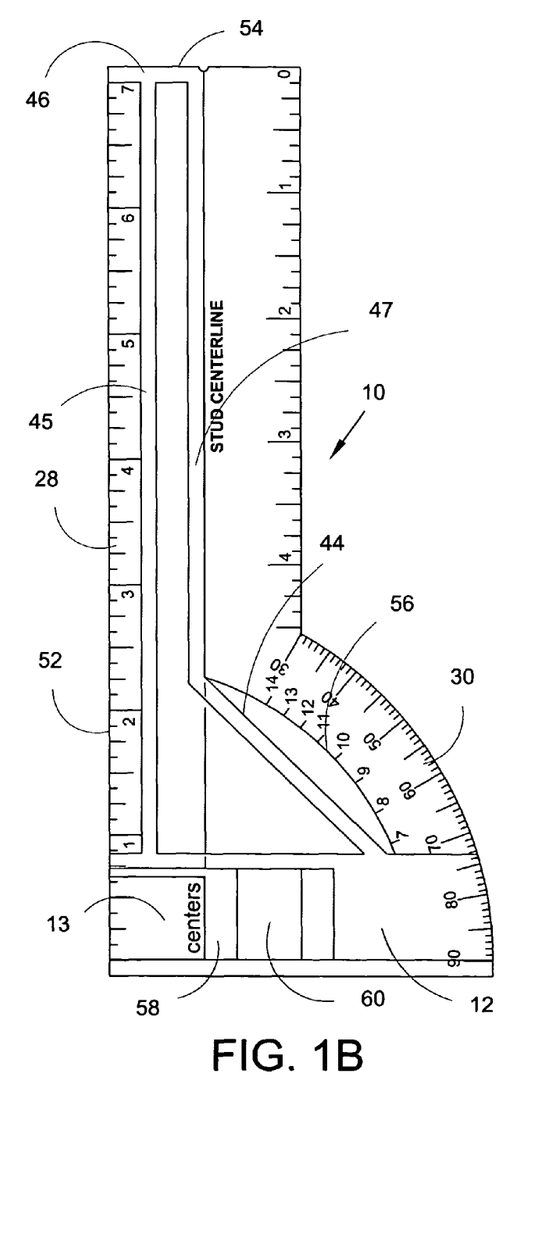
FIG. 1B is a top view.
Figure 1C:
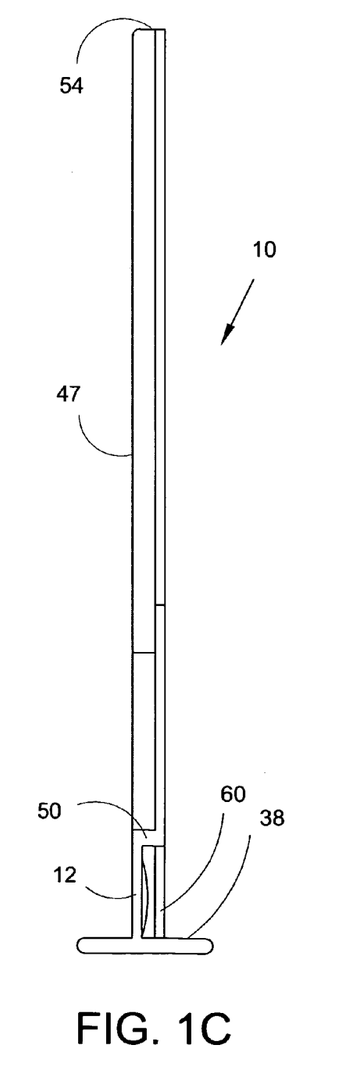
FIG. 1C is a right side view.
Figure 1D:
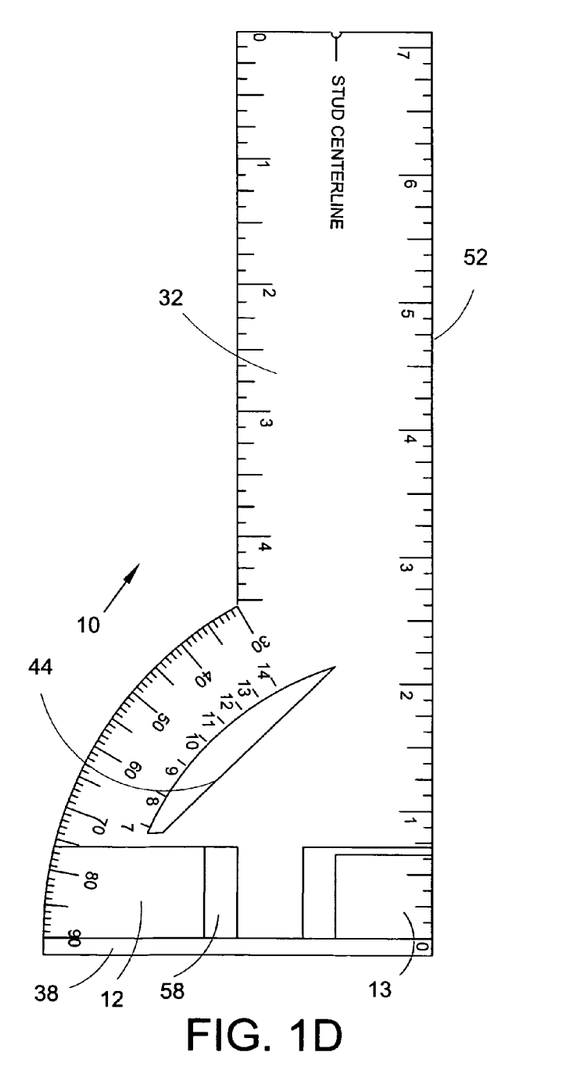
FIG. 1D is a bottom view.
Figure 2A:
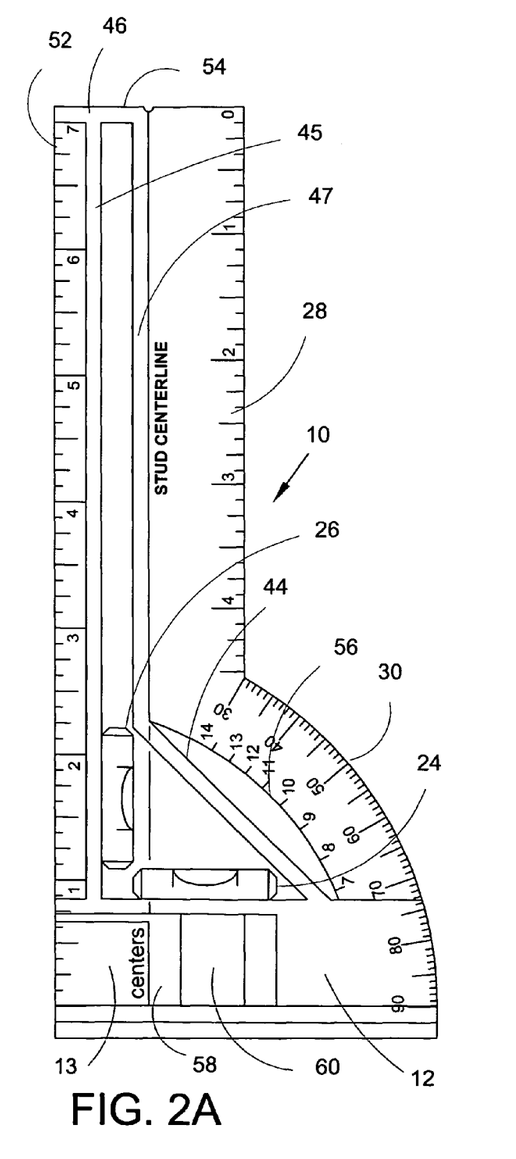
FIG. 2A is a top view of an embodiment with two-plane bubble levels and slide bridges.
Figure 2B:
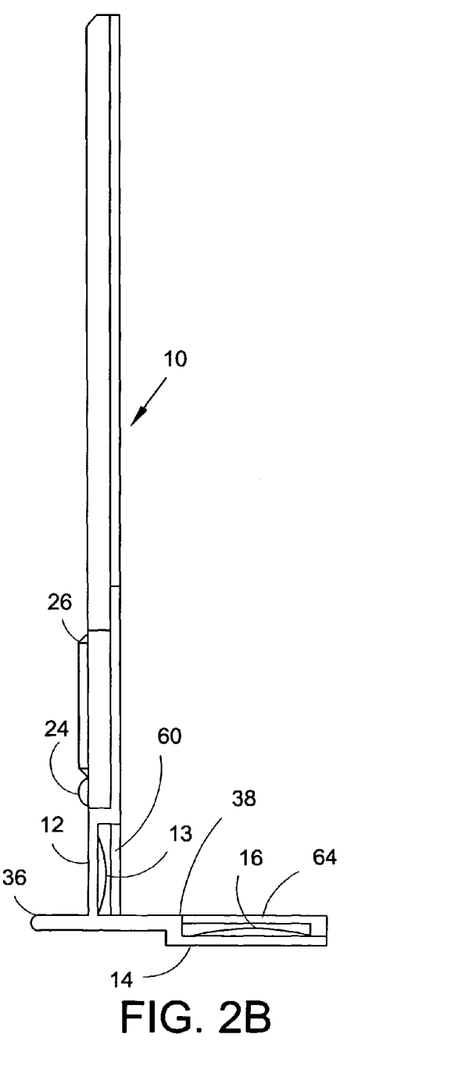
FIG. 2B is a right side view with two-plane bubble levels and slide bridges.
Figure 3A:
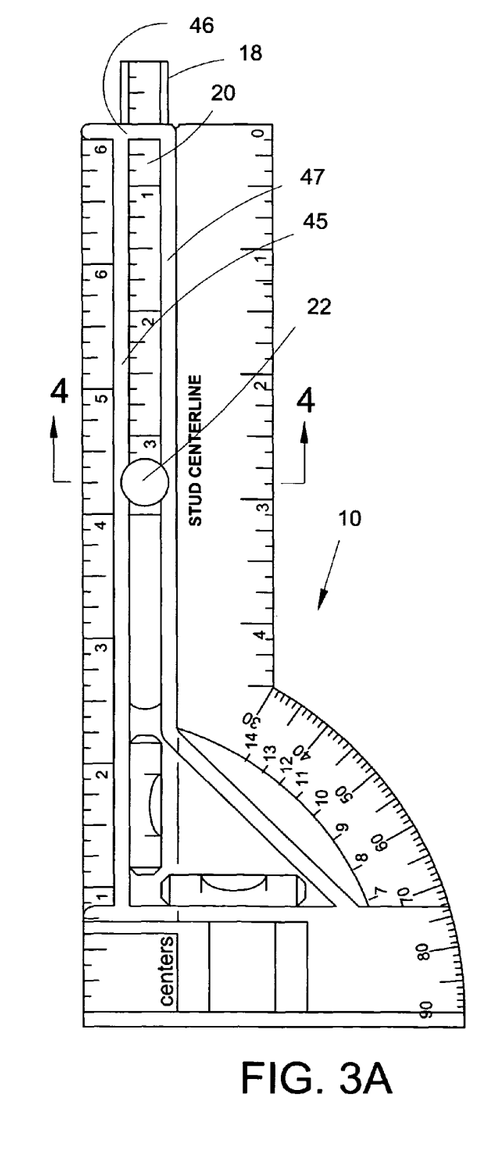
FIG. 3A is a top view with depth gauge.
Figures 3B, 4:
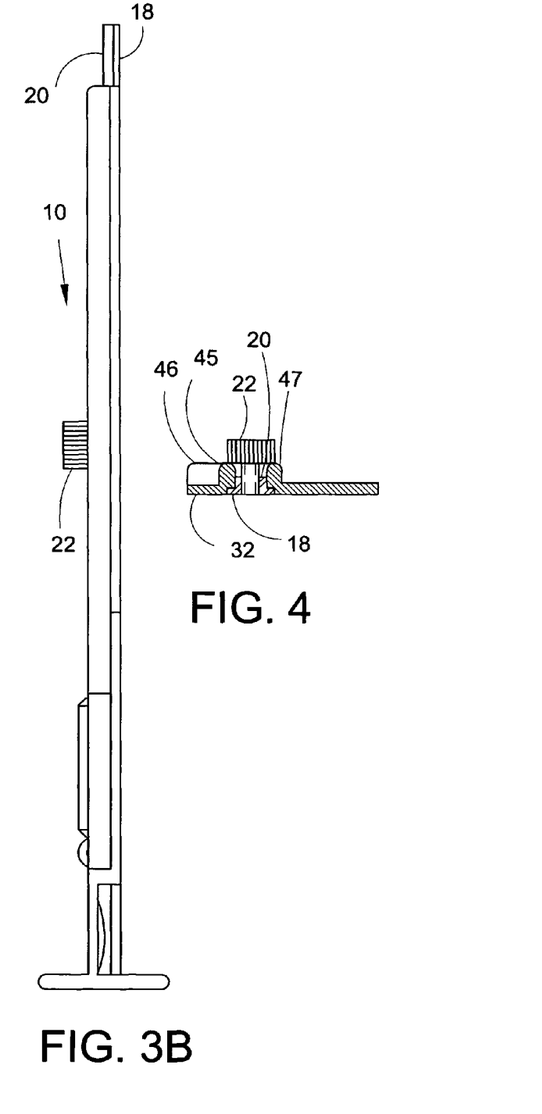
FIG. 3B is a right side view with depth gauge.
FIG. 4 is section view of depth gage along section lines 4-4.
Figure 6:
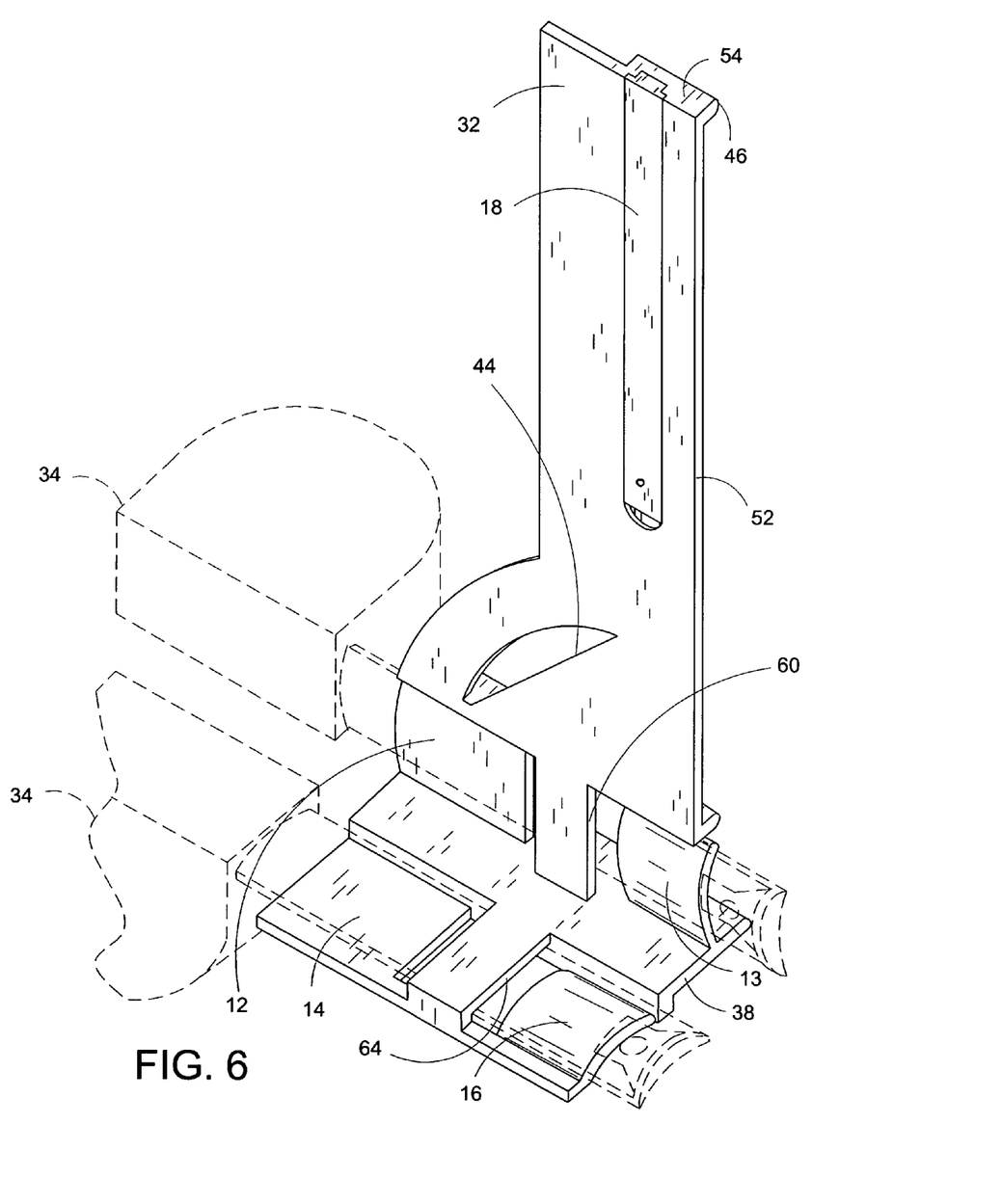
FIG. 6 is a perspective bottom view showing tape measures in both x and y plane.

FIGS. 2A and 2B show an embodiment of Sliding Square 10 as described above further embodying bubble levels 24 and 26 along the x and y planes respectively, attached to top surface of base 32 in-between stiffening ribs 45 and 47. This embodiment also illustrates y-plane slide opening 62 that is formed between y-plane slide bridge 64 and side wall 14 through which retractable tape measure 34 can be threaded as shown in FIG. 6. Second centering wall 16 has a similar structure and function for the y-plane tape installation as first centering wall 13 does for the x-plane retractable tape measure 34 utilization FIGS. 3A and 3B show an embodiment as described above further embodying a depth gage comprised of depth slide 18 with depth scale 20 embossed on the top surface of depth slide 18. Depth slide 18 is preferably constructed of a rectangular bar approximately 3⅝ inches long by ⅜ of an inch wide and ⅛ of an inch thick with 1/16 of an inch wide by 3/64 inch deep shoulders on each side as shown in FIG. 4. Base 32 is open between stiffening ribs 45 and 47 for approximately 3¾ inches back from distal end 54. A ⅜ inch wide by 3/64 inch deep channel is cut into bottom surface of base 32 spanning the width of the space between stiffening ribs 45 and 47. A hole is drilled and tapped toward the proximal end of depth slide 18. Depth slide 18 is placed into the previously described opening from the bottom and depth set retainer 22 is screwed into the tapped hole in depth slide 18 from the top. Depth set retainer 22 is larger in diameter than the span between stiffening ribs 45 and 47 and therefore when depth set retainer 22 is tightened it locks the depth slide 18 in place. When it is loosened it allows depth slide 18 to slip in and out to determine the depth of a given opening.

Figure 5:
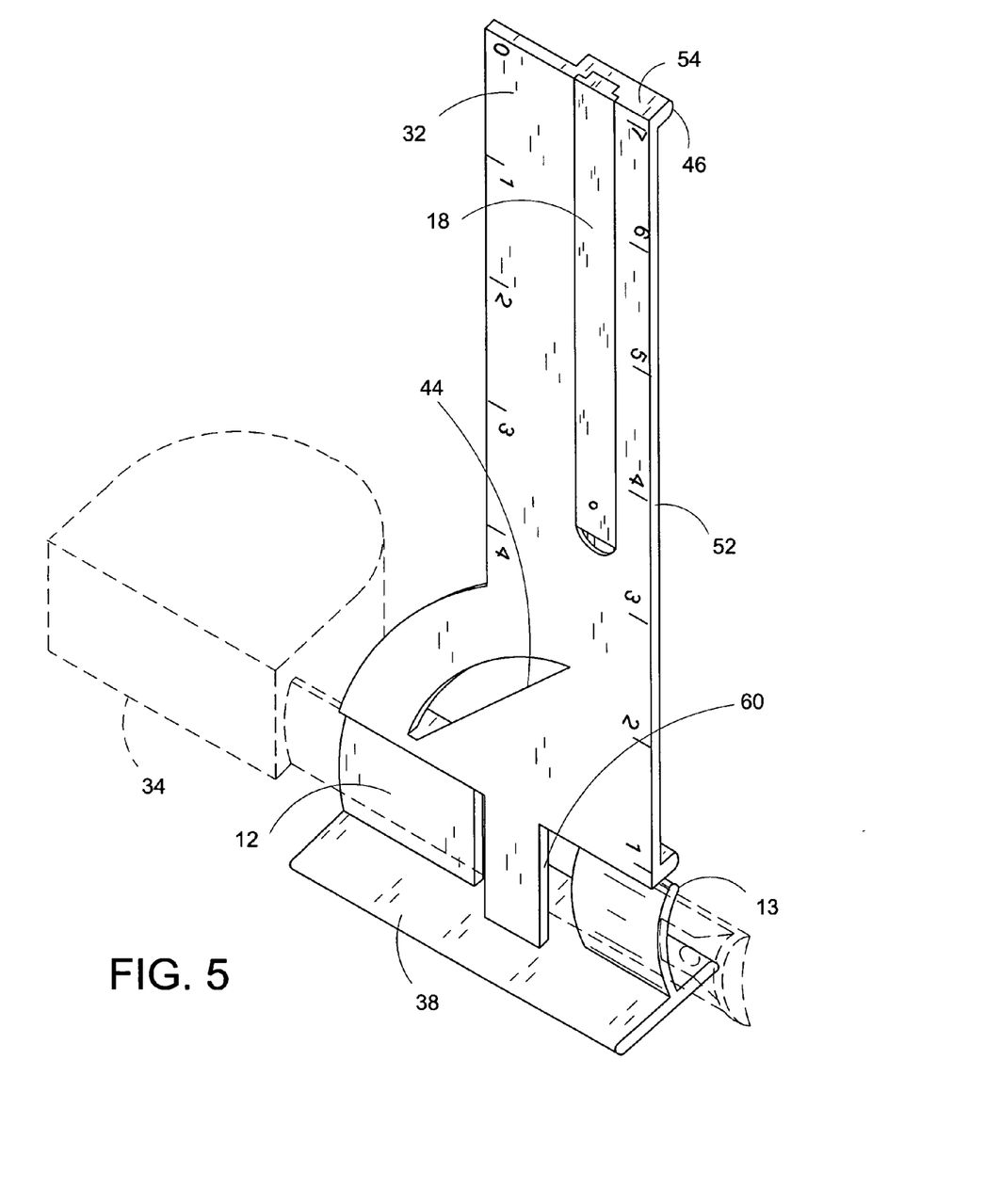
FIG. 5 is a perspective bottom view showing tape measure in x plane.

FIG. 5 discloses a perspective rear view of an embodiment of Sliding Square 10 with retractable tape measure 34 shown in broken lines as it is only shown to illustrate the environment in which Sliding Square 10 may be utilized but forms no part of the invention itself. Retractable tape measure 34 is shown slid through x-plane slide opening 58 over x-plane slide bridge 60 and under centering wall 13.

FIG. 6 is a perspective view of the back side of Sliding Square 10 further embodying an extension of abutment wall 38 with y-plane slide bridge 64 extending approximately 1 inch further away from bottom of abutment wall 38. In this embodiment, bottom of abutment wall 38 extends away from y-plane slide bridge 64 approximately ¼ inch and then turns back to side wall 14 similar to previously described top wall 12 with its tape opening 48 approximately 1 inch by ¾ inch starting approximately ¾ inch back from front face 52. Side wall 14, similar to top wall 12, is 1/16 inch below y-plane slide bridge 64 as to form y-plane slide opening 62. FIG. 6 shows Sliding Square 10 with retractable tape measures 34 in broken lines, installed in both x and y planes for illustration purposes. Retractable tape measure 34 would be used in either the x or y plane depending on the structure to be measured and again forms no part of this invention.

The Sliding Square 10 embodiments showed in FIGS. 1-7 disclose approximate dimensions for a 7 inch scale device for use with a ¾ inch wide retractable tape measure 34. The descriptions in the above specification are not intended to limit this invention to that ¾ inch retractable tape measure 34 but rather show it for illustration purposes only. One skilled in these arts could easily scale the invention's dimensions and materials to work with any standard tape measure and the linear scale and depth gauge are also not limited to the sizes shown here. Centering walls 13 and 16 however do allow several different tape widths to be utilized with Sliding Square 10 as shown. Sliding Square 10 may be configured using any or all of the features disclosed here in any combination without diverging from the design intent of this disclosure.

What is claimed is:

1. A layout tool that can be slipped over retractable tape measures for measuring and marking lines at a specific distance and angle from the ends of a work piece to a front face comprising:

a generally planar base with a top side, a bottom side and front face;

an abutment wall perpendicular to said front face and said base plane, adjacent to proximal end of said front face where the intersection point of said front face and the inside edge of said abutment wall form the zero point for both angular and linear measurements wherein said abutment wall extends above said base top side and below said base bottom side approximately an equal amount to allow sliding said abutment wall along either the left or right side of said work piece by turning said layout tool over while maintaining said front face as towards said end of said work piece;

a tape measure retaining slot formed with a top wall parallel to said base extending away from said abutment wall above said base a distance sufficient to allow the thickest tape measure intended for use with said layout tool to slide freely through said retaining slot wherein said top wall is of sufficient width that allows the widest tape measure intended for use with said layout tool to slide freely between said abutment wall and an inside wall that depends from said top wall to said base where base is open under said top wall except in the center where a slide bridge extension of said base connects to said abutment wall and said top wall has an opening above and sufficiently wider than said slide bridge section of said base to allow feeding said retractable tape measure up from said base bottom side, over said slide bridge and back down under a centering wall wherein said centering wall extends from past said slide bridge out to said front face.

2. The layout tool of claim 1 wherein said base top side and said bottom side have various indicia printed or embossed into one or both said sides comprising:

at least one linear scale along said front face beginning at the intersection of said abutment wall and said front face;

a protractor scale arc centered at said intersection of front face and said abutment wall with angular indicia beginning at said intersection;

two small bubble levels one mounted in the horizontal plane and one mounted to read in a vertical plane on said top side;

stiffening ribs parallel to said front face that are the same height as said top wall is above said top side of said base;

an interior opening in said base with the proximal edge of said opening a straight edge at a 45 degree angle to said abutment wall with the distal boundary of said opening an arc concentric to and inscribed within said protractor scale arc with standard rafter cut angles shown along said arc; and a distal end said base perpendicular to said front face, parallel to said abutment wall approximately 1½ inches in width with a stud centerline indicia printed or inscribed and linear measurement indicia along its edge opposite said front face.

3. The layout tool of claim 1 wherein said centering wall is chosen from a group of walls that either have a curvilinear shape that matches the contour of said retractable tape measure intended for use with said layout device; has a V shape with a smaller radius at its nether point than the smallest radius tape intended for use with said layout tool; or is a straight wall section which is an extension of said top wall wherein said centering wall section options are attached to said abutment wall at the same height as said top wall and may or may not be attached to said inside wall.

4. The layout tool of claim 1 further comprising a second tape measure retaining slot formed with a side wall perpendicular to said base extending parallel to said abutment wall outside said abutment wall a distance sufficient to allow the thickest tape measure intended for use with said layout tool to slide freely through said retaining slot wherein said side wall is of sufficient width that allows the widest tape measure intended for use with said layout tool to slide freely between said bottom of abutment wall and top of y plane slide bridge that depends from said y plane slide bridge to said sidewall wherein said abutment wall is open under said side wall except in the center where said y plane slide bridge extension of said abutment wall connects to said top of y plane slide bridge and said side wall has an opening above and sufficiently wider than said y plane slide bridge section of said abutment wall to allow feeding said retractable tape measure down from said abutment wall, under said slide bridge and back over a centering wall wherein said centering wall extends from past said slide bridge out to said front face.

5. The layout tool of claim 1 further comprising a depth slide with a top side and a bottom side where said bottom side is co-planer with said bottom side of said base and is extendable from said distal end of said base with depth scale indicia on said top side and can be locked at a given depth measurement by tightening a depth set retainer.

6. The layout tool of claim 1 wherein said centering walls have a rear face that is approximately ¾ inch from said front face such that when said rear face of said centering wall aligns with the desired center spacing of studs on said tape measure, lines drawn across said front face will be at the desired centers of said studs.

* * * * *